US009515513B2

United States Patent
Suzuki et al.

(10) Patent No.: US 9,515,513 B2
(45) Date of Patent: Dec. 6, 2016

(54) MOBILE DEVICE AND COMBO COIL MODULE

(71) Applicant: Sony Corporation, Tokyo (JP)

(72) Inventors: Katsuya Suzuki, Tokyo (JP); Kanjiro Shimizu, Tokyo (JP); Kuniharu Suzuki, Tokyo (JP)

(73) Assignees: Sony Corporation, Tokyo (JP); Sony Mobile Communications, Inc., Tokyo (JP)

( * ) Notice: Subject to any disclaimer, the term of this patent is extended or adjusted under 35 U.S.C. 154(b) by 676 days.

(21) Appl. No.: 13/892,930

(22) Filed: May 13, 2013

(65) Prior Publication Data

US 2014/0333253 A1    Nov. 13, 2014

(51) Int. Cl.
*H02J 7/02* (2016.01)
*H01F 27/36* (2006.01)
*H01F 38/14* (2006.01)
*H04B 5/00* (2006.01)

(52) U.S. Cl.
CPC .............. *H02J 7/025* (2013.01); *H01F 27/365* (2013.01); *H01F 38/14* (2013.01); *H02J 50/12* (2016.02); *H04B 5/0037* (2013.01); *H04B 5/0093* (2013.01)

(58) Field of Classification Search
CPC ...... H01F 38/14; H01F 27/365; H02J 7/025; H02J 50/12; H04B 5/0037; H04B 5/0093
See application file for complete search history.

(56) References Cited

U.S. PATENT DOCUMENTS

| 2013/0267170 A1* | 10/2013 | Chong | H04B 1/3833 455/41.1 |
| 2014/0091758 A1* | 4/2014 | Hidaka | H01F 38/14 320/108 |
| 2014/0145807 A1* | 5/2014 | Choi | H01F 38/14 335/302 |
| 2014/0291404 A1* | 10/2014 | Matsuoka | G06K 7/10881 235/462.46 |
| 2014/0306656 A1* | 10/2014 | Tabata | H01F 38/14 320/108 |
| 2014/0362505 A1* | 12/2014 | Jang | H05K 9/0075 361/679.4 |
| 2014/0375262 A1* | 12/2014 | Yamaguchi | H02J 7/025 320/108 |
| 2015/0123604 A1* | 5/2015 | Lee | H01F 38/14 320/108 |

FOREIGN PATENT DOCUMENTS

JP    2011-30299 A    2/2011

* cited by examiner

*Primary Examiner* — Lewis West
(74) *Attorney, Agent, or Firm* — Oblon, McClelland, Maier & Neustadt, L.L.P.

(57) ABSTRACT

An apparatus may include a near field communication (NFC) antenna coil and a wireless power receiving coil. The NFC antenna coil and the receiving coil may be arranged on a magnetic sheet. The wireless power receiving coil may be concentrically disposed on the magnetic sheet within an inner periphery of the NFC antenna coil. An inner diameter of the wireless power receiving coil may be greater than or equal to an inner diameter of reference listener antenna coil RL-6, of the reference listener coils specified by the NFC forum.

19 Claims, 12 Drawing Sheets

| # | Conditions of Coil Size | z=1mm RL-6 | AREA SIZE | | z=5mm RL-6 | AREA SIZE | |
|---|---|---|---|---|---|---|---|
| | | | [mm²] | [%] | | [mm²] | [%] |
| #1 | Di4 < Dirl6 and Do4 > Dorl3 | | a 670<br>b 542<br>c 469<br>T 1681 | 39.86<br>32.24<br>27.90<br>100.00 | | a 328<br>b 864<br>c 489<br>T 1681 | 19.51<br>51.40<br>29.09<br>100.00 |
| #2 | Di4 ≧ Dirl6 and Do4 > Dorl3 | | a 708<br>b 516<br>c 457<br>T 1681 | 42.12<br>30.70<br>27.19<br>100.00 | | a 334<br>b 887<br>c 460<br>T 1681 | 19.87<br>52.77<br>27.36<br>100.00 |
| #3 | Di4 ≧ Dirl6 and Do4 < Dirl3 | | a 843<br>b 554<br>c 284<br>T 1681 | 50.15<br>32.96<br>16.89<br>100.00 | | a 395<br>b 994<br>c 292<br>T 1681 | 23.50<br>59.13<br>17.37<br>100.00 |

MOBILE DEVICE AND COMBO COIL MODULE

BACKGROUND

Technical Field

The present disclosure relates to mobile devices, such as mobile telephone terminals. Specifically, the present disclosure relates to mobile devices provided with a near field communication function and a wireless charging function. Moreover, the present disclosure is related to a combo coil module that is incorporated in such a mobile device, the combo coil combining a near field communication antenna coil for near field communication, and a wireless power receiving coil for wireless charging.

Description of Related Art

Mobile devices in recent years have incorporated near field communication (NFC) functions. NFC is an international communication standard using a 13.56 MHz electromagnetic wave. NFC performs data communication at a range typically within 10 cm.

In recent years, the function of a non-contact IC card has been incorporated into mobile devices. A non-contact IC card technique called FeliCa (trademark) from Sony Corporation has been developed as a non-contact IC card function. A non-contact IC card may typically utilize a 13.56 MHz electromagnetic wave between readers/writers, and perform communication at 100 to 400 kbps at about a 10 cm range. The communication standard used by FeliCa is NFC. That is, NFC is an upward compatibility of FeliCa. In the present disclosure, the antenna for NFC/FeliCa is generally called an NFC antenna.

Generally, an NFC antenna mounted in a mobile device may be influenced by metals, such as a battery pack that exists in the vicinity of the NFC antenna. One measure for mitigating the influence of metallic elements on the NFC antenna is by shielding the battery pack magnetically by arranging a magnetic sheet between, e.g., the NFC antenna and the battery pack which is arranged behind the NFC antenna. Another measure for mitigating the influence of metallic elements on an NFC antenna is by arranging the NFC antenna at a position substantially away from the battery pack such that the antenna does not experience the influence of the metallic elements.

Furthermore, when a mobile device has a function of wirelessly charging a battery mounted inside the mobile device, a wireless power receiving coil may be arranged in the mobile device. The wireless power receiving coil typically has a specified plane coil structure of about a 30 mm diameter.

SUMMARY

The foregoing general description of illustrative embodiments and the following detailed description thereof are merely exemplary aspects of the teachings of this disclosure, and are not restrictive.

Design limitations on mobile devices restrict the ability to simultaneously mount a wireless power receiving coil and an NFC antenna coil when wireless charging and near field communication are desired in the same mobile device. Additionally, performance characteristics of both the NFC antenna coil and the wireless power receiving coil should be considered when designing the arrangement and size of each coil module. That is, the arrangement and/or sizing of each of the NFC antenna coil and the wireless power receiving coil should be designed such that, e.g., one side of a coil does not inhibit performance characteristics of the other. Additionally, the arrangement and/or sizing of each of the NFC antenna coil and the wireless power receiving coil should be designed such that the influence of metallic elements included elsewhere in the mobile device is inhibited.

Among other things, the present disclosure describes a combo coil module that provides high performance characteristics for both an NFC antenna coil and a wireless power receiving coil, while preventing the influence of metallic parts in a mobile device from impairing performance of the combo coil module.

A combo coil module of the present disclosure may include an NFC antenna coil and a wireless power receiving coil. The NFC antenna coil and the wireless power receiving coil may be arranged on a magnetic sheet. The wireless power receiving coil may be concentrically disposed on the magnetic sheet within an inner periphery of the NFC antenna coil. An inner diameter of the wireless power receiving coil may be greater than or equal to an inner diameter of reference listener antenna coil RL-6, of the reference listener coils specified by the NFC forum.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Referring now to the drawings, wherein like reference numerals designate identical or corresponding parts throughout the several views.

Figure 1A:
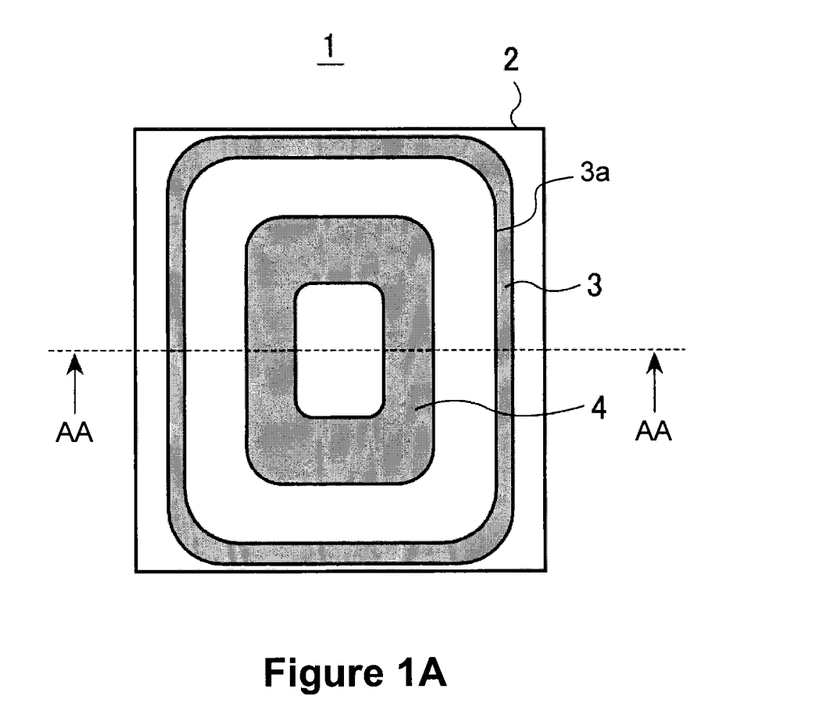
FIGS. 1A and 1B respectively illustrate a top view and a cross-sectional view of an exemplary combo coil module.
Figure 1B:
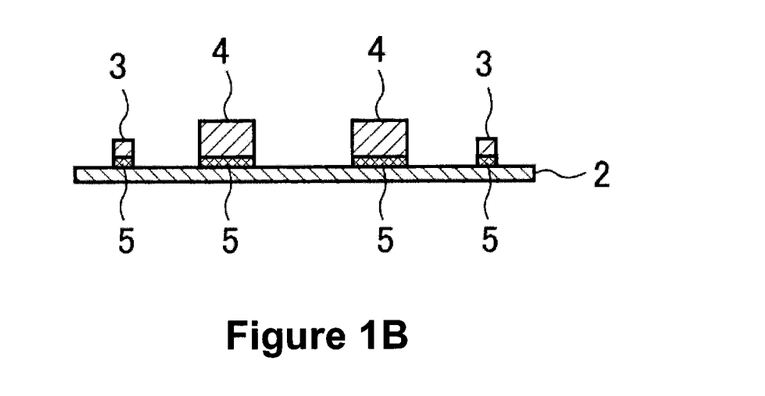

First, FIGS. 1A and 1B respectively illustrate a top view and a cross-sectional view of an exemplary combo coil module 1. In particular, FIG. 1B illustrates a cross-sectional view corresponding to line AA shown in FIG. 1A. For simplicity, detailed wiring and connection points for the combo coil module 1 are omitted from the figures.

As shown in FIG. 1A, the exemplary combo coil module 1 may include a wireless power receiving coil 4 concentrically disposed within an inner edge 3a of an NFC antenna coil 3. The NFC antenna coil 3 and the wireless power receiving coil 4 may be arranged upon a magnetic sheet 2. The magnetic sheet 2 may be sized such that the performance characteristics of elements arranged within the combo coil module 1 are not influenced by external metal objects, such as a battery pack within a mobile device. In the case in which the magnetic sheet 2 is included for preventing influence of a battery pack, the magnetic sheet 2 may be sized such that it is substantially the same size of the corresponding battery pack. Further, dimensions of the magnetic sheet 2 may be greater than or equal to dimensions of the battery pack. Moreover, the magnetic sheet 2 may have dimensions corresponding to another element in a mobile phone device to mitigate influence of the element on the performance of the combo coil module 1.

The NFC antenna coil 3 and the wireless power receiving coil 4 may be mounted on the magnetic sheet 2 such that a mobile device battery is separated from the NFC antenna coil 3 and the wireless power receiving coil 4 by the magnetic sheet 2 (e.g., the battery is housed behind the magnetic sheet 2 when installed in a mobile device).

Referring now to FIG. 1B, the NFC antenna coil 3 and the wireless power receiving coil 4 may be mounted on the magnetic sheet 2 by an affixing element 5. The affixing element 5 may, e.g., be double-sided tape or another suitable adhesive agent. While FIG. 1B illustrates the NFC antenna coil 3 and the wireless power receiving coil 4 as being mounted flush with a top surface of the magnetic sheet 2, this arrangement should not be construed as limiting.

Both the NFC antenna coil 3 and the wireless power receiving coil 4 may be formed by winding electroconductive wire multiple times to form the respective antenna/coil. Usually, the thickness (i.e., a width of a coil's perimeter edge, such as inner edge 3a) of the wireless power receiving coil 4 is greater than the thickness of the NFC antenna coil 3. However, this should not be construed as limiting, and it should be appreciated that the thickness of the NFC antenna coil 3 may be equal to or greater than the thickness of the wireless power receiving coil 4.

As previously mentioned, the magnetic sheet 2 may be included in the combo coil module 1 for mitigating the influence of metallic objects (e.g., a battery pack) located within a predetermined proximity of the combo coil module 1. As a non-limiting example, the magnetic sheet 2 may be formed by ferrous materials with comparatively high magnetic permeability with respect to a target frequency corresponding to the combo coil module 1. With the presence of the magnetically permeable magnetic sheet 2, a magnetic flux that is generated from the NFC antenna coil 3 that opposes the combo coil module 1 may flow through the inside of the magnetic sheet 2 without a magnetic loss such that the magnetic flux is concentrated in the magnetic sheet 2.

Figure 2A:
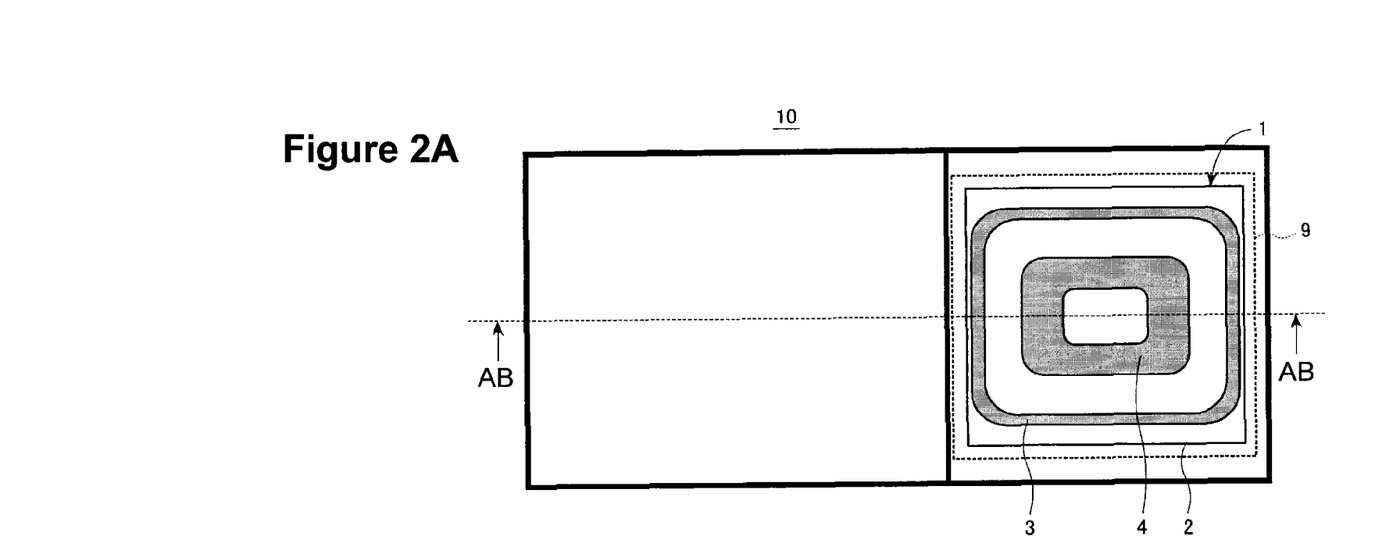
FIGS. 2A and 2B respectively illustrate a top view and cross-sectional view of exemplary mobile device that includes an exemplary combo coil module.
Figure 2B:
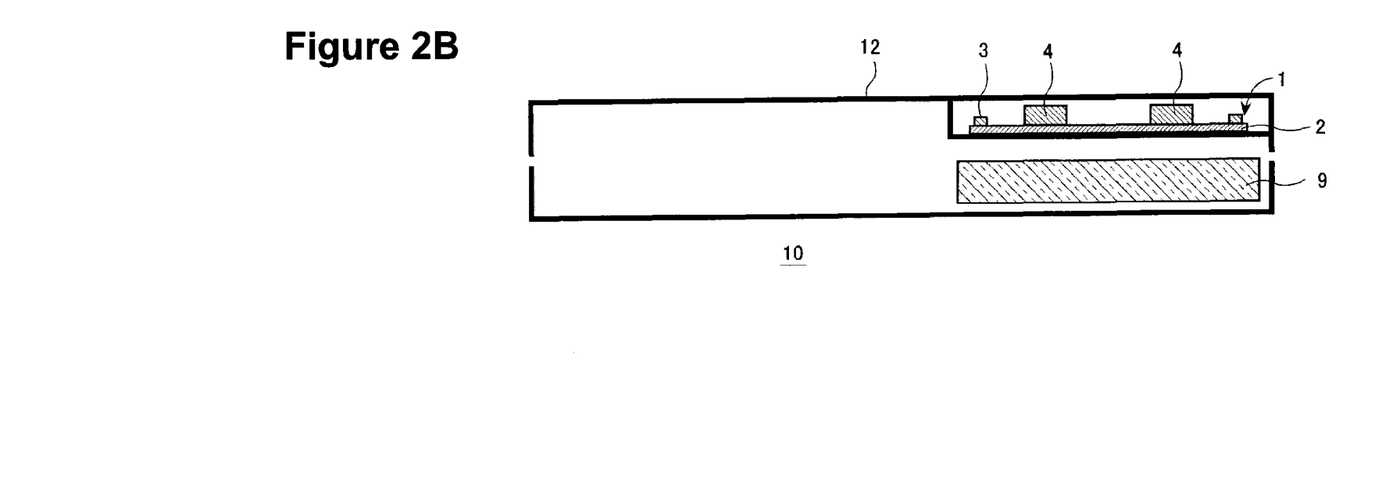

Next, FIGS. 2A and 2B respectively illustrate a top view and cross-sectional view of a non-limiting example of a mobile device 10 that includes the exemplary combo coil module 1. Specifically, FIG. 2B provides a cross-sectional view corresponding to line AB shown in FIG. 2A. The mobile device 10 illustrated in this example may, e.g., be a cellular telephone, a smartphone, a tablet computer, or the like. For simplicity, elements that are typical to mobile devices, such as a display screen, are omitted in the drawings.

In the exemplary case of FIGS. 2A and 2B, the combo coil module 1 is arranged within the mobile device 10 at a location corresponding to a battery pack 9. That is, the battery pack 9 is located at a position within the mobile device 10 that is behind the magnetic sheet 2. The mobile device 10 may include a battery cover 12, which may have dimensions corresponding to those of the mobile device 10. Alternatively, the battery cover 12 may have dimensions corresponding to the battery pack 9. The battery pack 9 may be a direct current (DC) power source for providing wireless power to the mobile device 10. Additionally, the battery pack 9 may include and/or interface with power circuitry for powering the mobile device 10 and/or charging the battery pack 9. The power circuitry may receive power from an alternating current (AC) power source.

Figure 3A:
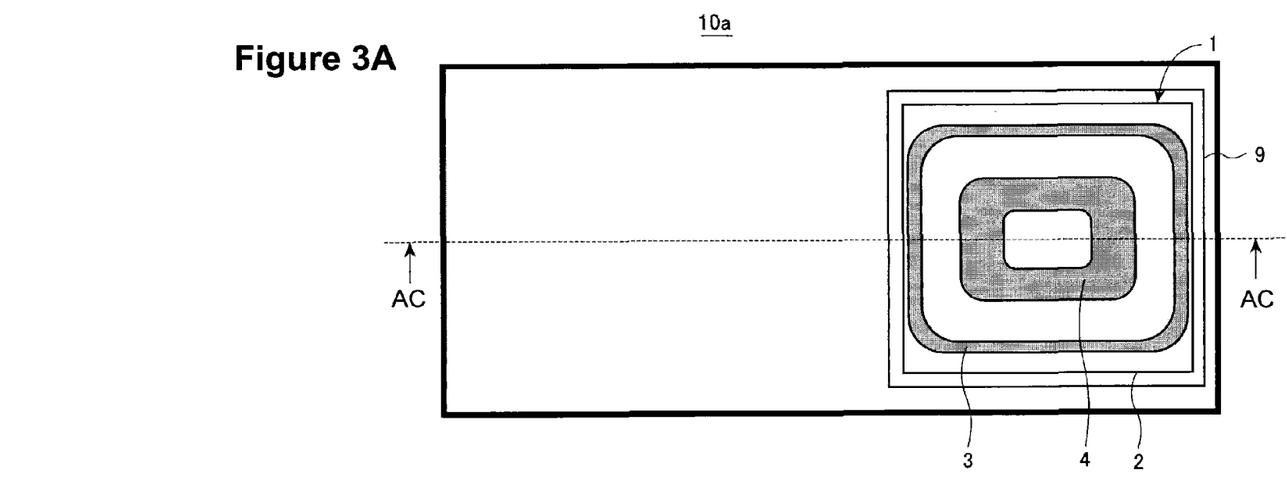
FIGS. 3A and 3B respectively illustrate a top view and a cross-sectional view of an exemplary mobile device that includes an exemplary combo coil module formed integrally with a battery pack.
Figure 3B:
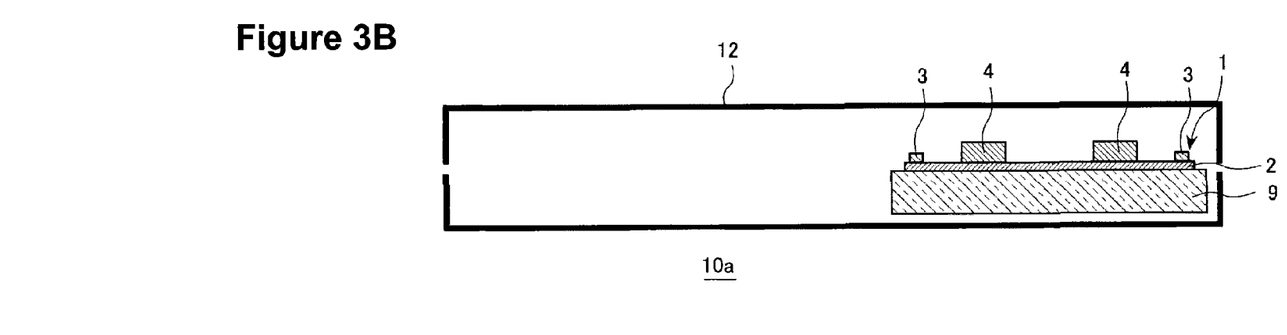

While the examples shown in FIGS. 2A and 2B illustrate the case in which the combo coil module 1 is formed as a separate body from the battery pack 9, this should not be construed as limiting. As a non-limiting example, FIGS. 3A and 3B respectively illustrate a top view and a cross-sectional view of a mobile device 10a in which the combo coil module 1 is formed integrally with the battery pack 9. Referring to FIG. 3B, the combo coil module 1 may be mounted on a top surface of the battery pack 9 within the mobile device 10a. The combo coil module 1 of FIG. 3B may be mounted to the battery pack 9 by use of a common adhesive agent/method.

Next, as an operational mode of a mobile device that includes a near field communication function, there commonly exists a read/write (R/W) mode and a card emulation mode. In R/W mode, a mobile device may function as a reader/writer (initiator) that reads/writes from/to an external NFC tag (namely, a target). In card emulation mode, a mobile device may become a target and function as a non-contact IC card accessed from an external initiator. In R/W mode, operation of a mobile device that includes a near field communication function may be tested with a device called a reference listener. Three exemplary reference listener devices specified by the NFC forum include RL-1, RL-3, and RL-6. In card emulation mode, operation of a mobile device that includes a near field communication function may be tested with a device called a reference polar.

Figure 4A:
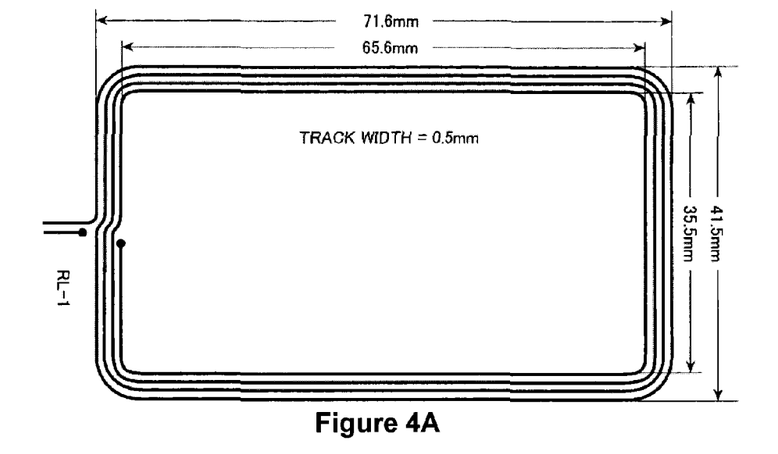
FIGS. 4A to 4C illustrate dimensions of three types of reference listener device coils that are specified by the NFC forum.
Figure 4B:
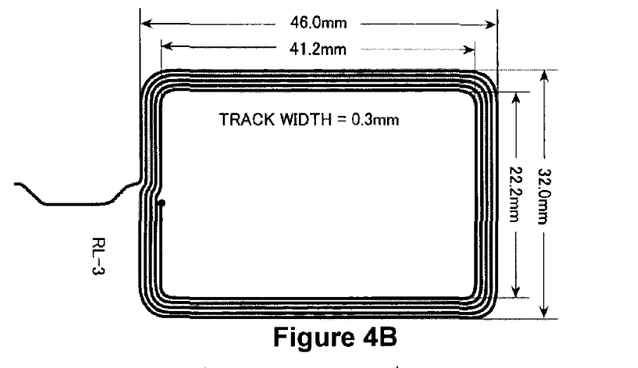
Figure 4C:
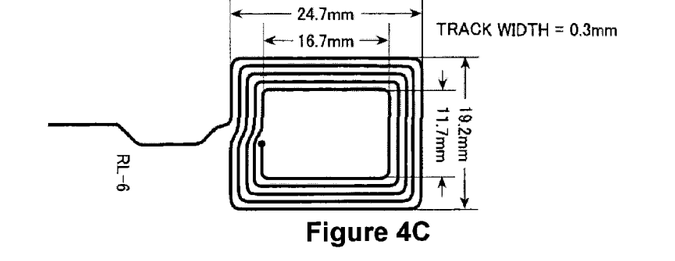

The dimensions of three types of reference listener device coils that are specified by the NFC forum are respectively shown in FIGS. 4A through 4C. The reference listener coils shown in FIGS. 4A through 4C are comprised of a wire wound multiple times in a substantially rectangular shape. Further, each reference listener coil includes an inner diameter and an outer diameter corresponding to a distance between an outer edge and an inner edge, respectively, of the longitudinal sides of the reference listener coils. For example, the reference listener coil RL-1 of FIG. 4A is illustrated as having inner diameters of 35.5 millimeters and 65.6 millimeters. Similarly, the reference listener coil RL-1 of FIG. 4A is shown as having outer diameters of 41.5 millimeters and 71.6 millimeters. Inner and outer diameters of the reference listener coils RL-3 and RL-6 of FIGS. 4B and 4C, respectively, are similarly illustrated in the figures. Regarding the respective sizes of the reference listener coils of FIGS. 4A through 4C, reference listener coil RL-1 is the largest of the three coils, and reference listener coil RL-6 is the smallest of the three coils.

The size/dimension of the NFC antenna coil 3 and the wireless power receiving coil 4 may be determined based on the reference listener coils of FIGS. 4A to 4C. Determining a size/dimension of the NFC antenna coil 3 and the wireless power receiving coil 4 based on the reference listener coils of FIGS. 4A to 4C enables the reduction of adverse performance effects of the NFC antenna and wireless power receiving coils with respect to each other when they are simultaneously mounted on the combo coil module 1.

Figures 5A, 5B:
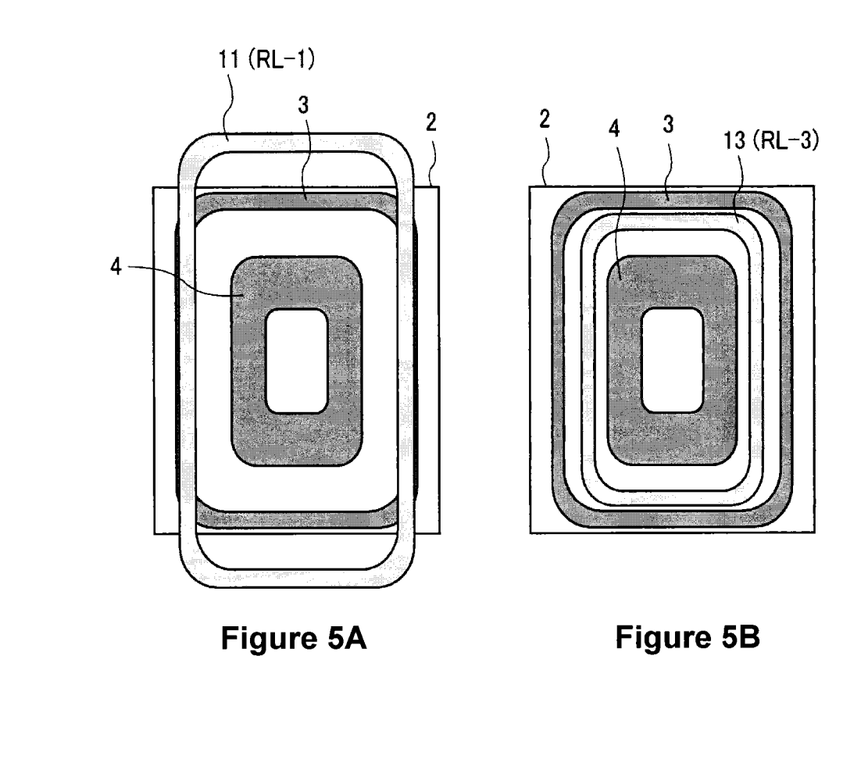
FIGS. 5A to 5C illustrate an exemplary method of determining dimensional characteristics of an NFC antenna coil and a wireless power receiving coil with respect to reference listener coils RL-1, RL-3, and RL-6, which are shown in FIGS. 5A through 5C.
Figure 5C:
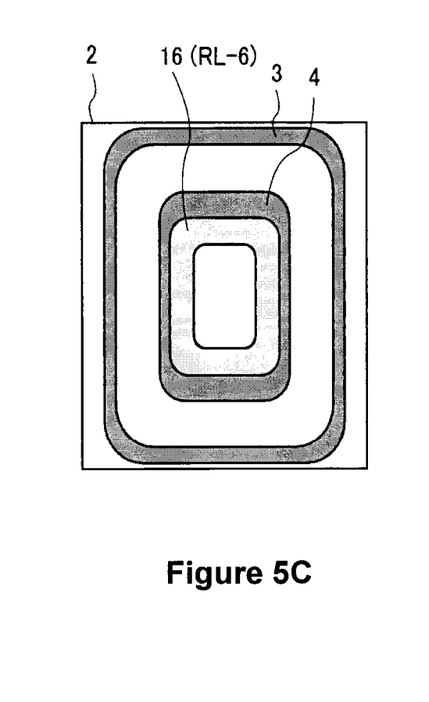

An exemplary method of determining dimensional characteristics of the NFC antenna coil 3 and the wireless power receiving coil 4 with respect to the reference listener coils RL-1, RL-3, and RL-6, is shown in FIGS. 5A through 5C. Hereinafter, the reference listener coils RL-1, RL-3, and RL-6 may respectively shown/described as opposing antennas 11, 13, and 16. The opposing antennas 11, 13, and 16 are referred to as opposing antennas since reference listener antennas are typically used by facing (i.e., "opposing") the reference listener antenna to the combo coil module.

Each of FIGS. 5A through 5C illustrates one of the three reference listener antennas overlapping the combo coil module 1. The reference listener coils overlapping the combo coil module 1 are assumed to be of a different dimension than the combo coil module 1. Further, it is assumed that the reference listener coil overlapping the combo coil module 1 is aligned at a common center point of both the reference listener coil and the combo coil. However, these assumptions should not be construed as limiting.

Referring first to FIG. 5A, in a non-limiting example, a size (namely, an outer diameter) of an outermost periphery of the NFC antenna coil 3 may be determined in the exemplary method of FIG. 5A such that it corresponds to a size of the biggest antenna (i.e. RL-1) among opposing antennas 11, 13, and 16. Further, the NFC antenna coil 3 may be formed by winding a wire toward an inner side of the coil from the outermost periphery such that a desired inductance can be obtained from the NFC antenna coil 3.

Next, FIG. 5B illustrates a non-limiting example of a method of determining dimensions of an outer diameter of the wireless power receiving coil 4. Referring to FIG. 5B, the outer diameter of the wireless power receiving coil 4 may be determined such that it is smaller than an internal diameter of the opposing antenna 13. The condition of forming the outer diameter of the wireless power receiving coil 4 such that it is smaller than the internal diameter of the opposing antenna 13 is intended to make as small as possible the surface area in which the wireless power receiving coil 4 interrupts the magnetic field of the NFC antenna coil 3 with respect to the opposing antenna 13. In this way, a magnetic field of the NFC antenna coil 3 may pass through the space in the internal diameter of the wireless power receiving coil 4, thereby coupling it with the opposing antenna 16. Careful design consideration under this condition ensures that the surface area of the wireless power receiving coil 4 comprises the minimum surface area that interrupts the magnetic field of the NFC antenna coil 3 to the opposing antenna 11 and the opposing antenna 13.

Next, FIG. 5C illustrates an exemplary method of determining a size (namely, an internal diameter) of the innermost periphery of the wireless power receiving coil 4. In the example of FIG. 5C the internal diameter of the wireless power receiving coil 4 is determined such that it is substantially the same or greater than the internal diameter of the opposing antenna 16.

Lastly, as previously mentioned, the NFC antenna coil 3 and the wireless power receiving coil 4 may differ in terms of thickness. While not limiting, the NFC antenna coil 3 is assumed to be thinner than the wireless power receiving coil 4 in the foregoing examples. An NFC antenna coil exhibits good performance characteristics when a distance in a z-direction from the antenna (i.e. a direction vertical/normal to the antenna surface) separates the NFC antenna coil from a corresponding/opposing antenna. Therefore, when an NFC antenna coil 3 is mounted on the magnetic sheet 2 such that the performance characteristics in the z-direction are optimized, the amount at which the thickness of a mobile device increases can be kept to a minimum.

Figure 6:
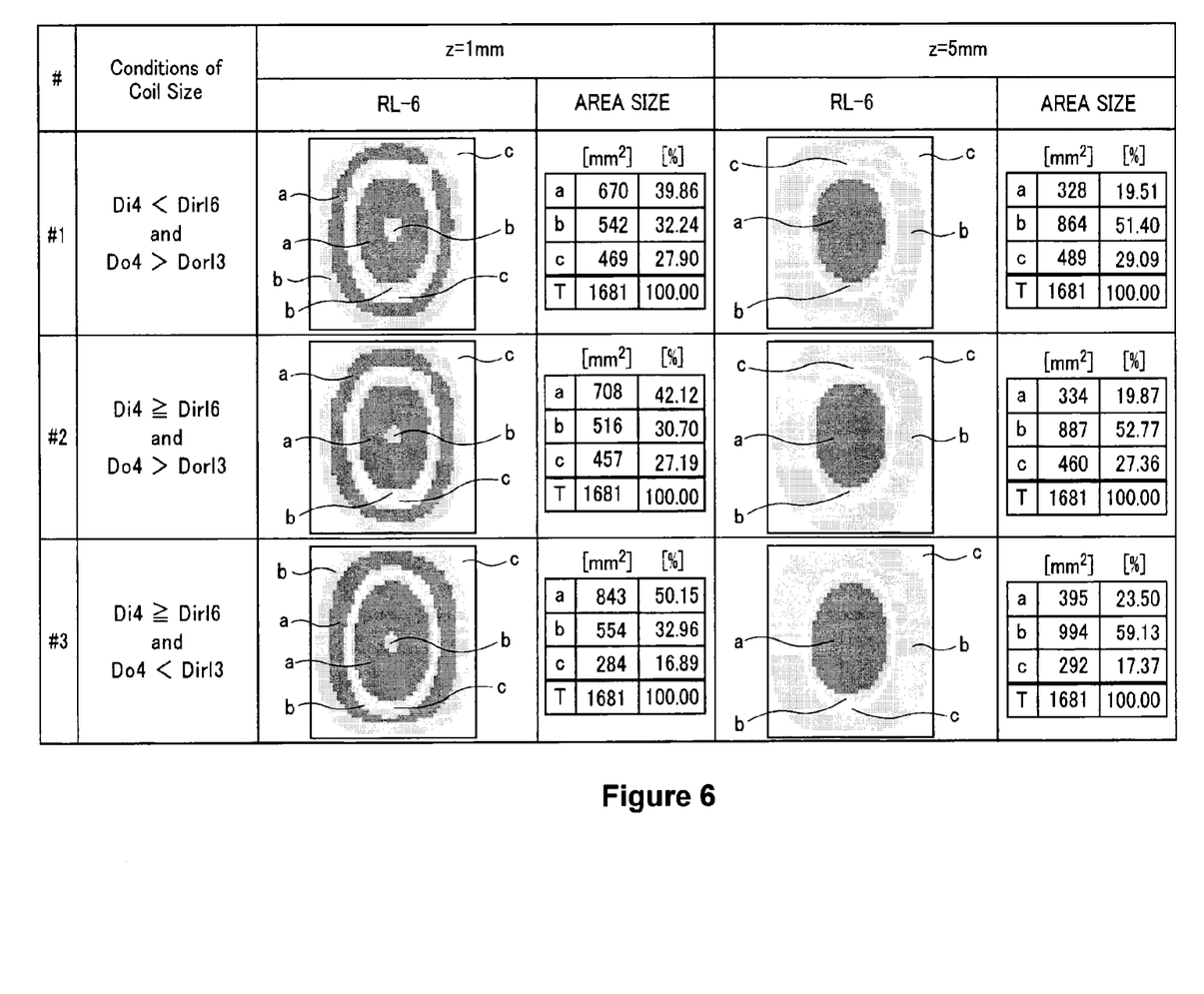
FIG. 6 illustrates exemplary experimental results from a magnetic field simulation using an exemplary combo coil module and a reference listener coil.

Next, FIG. 6 illustrates exemplary experimental results from a magnetic field simulation using the combo coil module 1 and the opposing antenna 16 (i.e. the reference listener antenna RL-6). The experimental results shown in FIG. 6 are performed under three conditions, which are labeled within FIG. 6 as #1, #2, and #3. The three conditions used in the experiment of FIG. 6 are defined as follows:

Condition #1: $Di4 < Dir16$, and
$Do4 > Dor13$.
Condition #2: $Di4 \geq Dir16$, and
$Do4 > Dor13$.
Condition #3: $Di4 \geq Dir16$, and
$Do4 < Dir13$.

Referring to the above conditions, $Di4$ represents the internal diameter of the wireless power receiving coil 4. $Dir16$ represents the internal diameter of the opposing antenna 16 (i.e. reference listener antenna RL-6). $Do4$ represents the outer diameter of the wireless power receiving coil 4. $Dor13$ represents the outer diameter of the opposing antenna 13 (i.e. the reference listener antenna RL-3). $Dir13$ represents the internal diameter of the opposing antenna 13. The variable "z" represents a distance from the opposing antenna 16 to the combo coil module 1. In the non-limiting example of FIG. 6, the experimental results were performed with z=1 millimeter and z=5 millimeters.

Next, the "AREA SIZE" columns shown in FIG. 6 indicate the distribution state ($mm^2$) and the degree of magnetic coupling (%) in the area where the combo coil module 1 opposes the opposing antenna 16. The area "a" in FIG. 6 is defined as an area that shows a level of favorable magnetic coupling. The area "b" in FIG. 6 is defined as an area in which the level of magnetic coupling fell from that shown in the area a. The area "c" shown in FIG. 6 is defined as an area in which the level of magnetic coupling is poor. Lastly, "T" is defined as the total area (i.e. the sum of areas a, b, and c).

As shown in FIG. 6, the area a is shown to be greatest under condition #3 for both the case of z=1 millimeter and z=5 millimeters. That is, condition #3 exhibits the best magnetic coupling characteristics between the NFC antenna 3 and the opposing antenna 16. Lastly, it should be appreciated that reference listener antenna RL-6 was chosen for illustrative purposes in the experimental results shown in the example of FIG. 6 due to the high level of magnetic coupling seen with reference listener antenna RL-6.

Next, as discussed previously, the wireless power receiving coil 4 may interrupt a part of a magnetic field of the NFC antenna coil 3 depending on the relative arrangement of the coils and therefore, presence of the wireless power receiving coil 4 may consequently reduce performance characteristics of the NFC antenna coil 3. To address this issue, aspects of the present disclosure may include an additional resonance coil on the combo coil module 1.

Figure 7A:
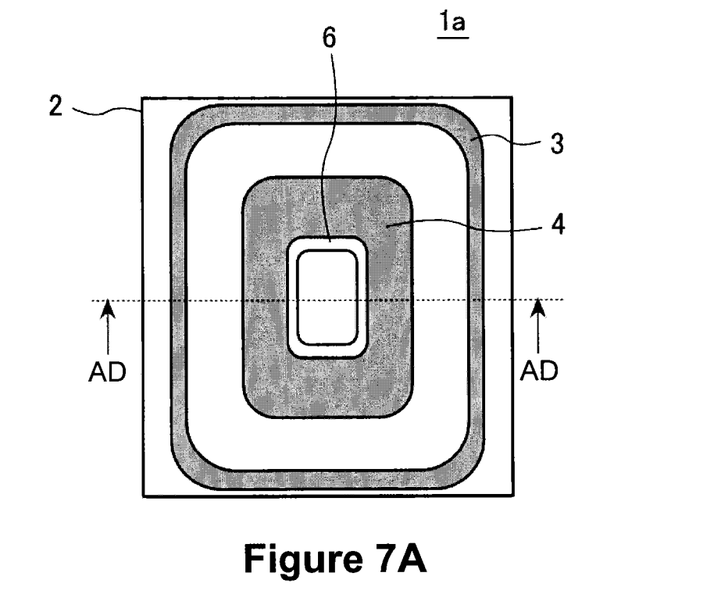
FIGS. 7A and 7B respectively illustrate a top view and a cross-sectional view of an exemplary combo coil module that includes a resonance coil.
Figure 7B:
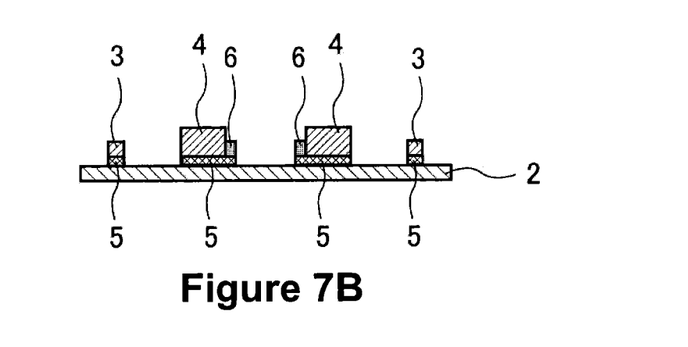

As a non-limiting example of providing a resonance coil on a combo coil module, FIGS. 7A and 7B respectively illustrate a top view and a cross sectional view of a combo coil module 1a that includes a resonance coil 6. Specifically, FIG. 7B provides a cross-sectional view corresponding to the line AD shown in FIG. 7A. As shown in FIGS. 7A and 7B, the resonance coil 6 may be arranged inside the internal diameter of the wireless power receiving coil 4, and the resonance coil 6 resonates with the NFC antenna coil 3. Consequently, it is expected that the magnetic coupling of the NFC antenna coil 3 and an opposing antenna (e.g., antennas 11, 13, or 16) becomes strong following the addition of the resonance coil 6 to combo coil module 1a. As shown in FIG. 7B, the resonance coil 6 may be mounted on the surface of the magnetic sheet 2 within the inner diameter of the wireless power receiving coil 4 via the affixing element 5.

Figure 8:
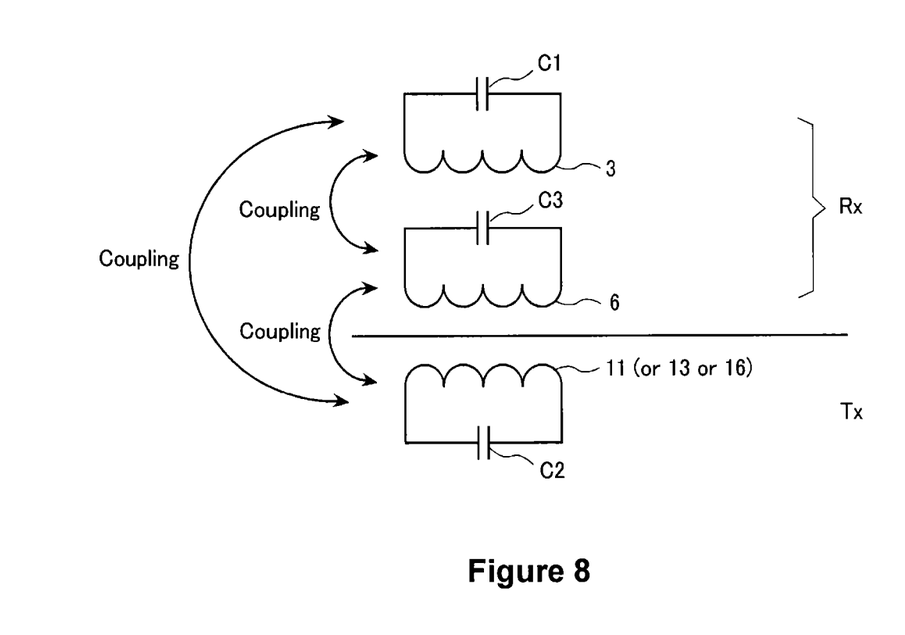
FIG. 8 illustrates an exemplary equivalent circuit diagram showing the relationship between an NFC antenna coil, a resonance coil, and an opposing antenna.

Next, FIG. 8 illustrates an exemplary equivalent circuit diagram showing the relationship between the NFC antenna coil 3, the resonance coil 6, and an opposing antenna (e.g., antenna 11, 13, or 16). Referring to the figure, the NFC antenna coil 3 may be connected with a capacitor C1 to form a resonance circuit of a predetermined frequency (e.g., 13.56 MHz for NFC). The coil of the opposing antenna (e.g., opposing antenna 11/13/16) may be connected with a capacitor C2 to form a resonance circuit of the predetermined frequency. Similarly, the resonance coil 6 may be connected with the capacitor C3 to form a resonance circuit of the predetermined frequency. FIG. 8 illustrates that in addition to the magnetic coupling between the NFC antenna coil 3 and the opposing antenna 11 (or 13 or 16), there exists a magnetic coupling between the NFC antenna coil 3 and the resonance coil 6, as well as a magnetic coupling between the resonance coil 6 and the opposing antenna 11 (or 13 or 16).

Figure 9A:
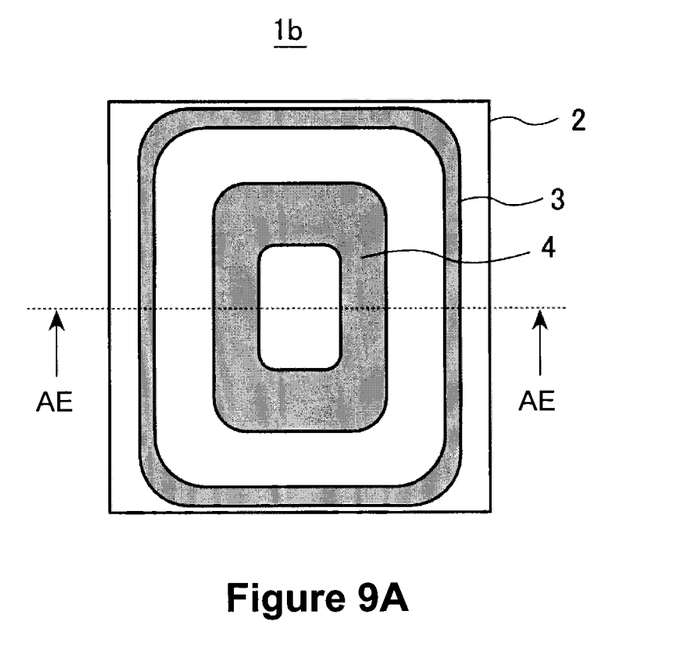
FIGS. 9A and 9B provide non-limiting examples of another aspect of the present disclosure in which an NFC antenna coil and a wireless power receiving coil are embedded within a magnetic sheet to form a combo coil module.
Figure 9B:
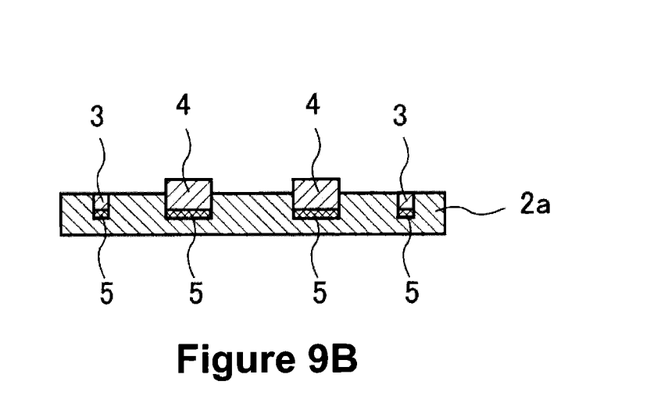

Next, FIGS. 9A and 9B provide non-limiting examples of another aspect of the present disclosure in which the NFC antenna coil 3 and the wireless power receiving coil 4 are embedded within a magnetic sheet to form a combo coil module. Specifically, FIG. 9B provides a cross-sectional view corresponding to the line AE shown in FIG. 9A. Referring to the figures, a magnetic sheet 2a may have a size corresponding to a size of the NFC antenna coil 3 and/or a battery pack. Further, the antenna coil 3 and the wireless power receiving coil 4 may be embedded within the magnetic sheet 2a at a thickness corresponding to the NFC antenna coil 3 thickness. Compared with the magnetic sheet 2 discussed previously with respect to FIGS. 1A and 1B, the thickness of the magnetic sheet 2a may be increased by an amount corresponding to a thickness of the NFC antenna coil 3.

Referring to FIG. 9B, the affixing element 5 may be assumed to be an adhesive agent of negligible thickness, whereby only a top surface of the NFC antenna coil 3 is exposed from a top surface of the magnetic sheet 2a. Alternatively, a side portion of the NFC antenna coil 3 may be exposed above the magnetic sheet 2a top surface. Additionally, with the wireless power receiving coil 4 having a thickness that is greater than the NFC antenna coil 3, an upper part of the wireless power receiving coil 4 may be exposed above the top surface of the magnetic sheet 2a. Under the exemplary structure illustrated in FIGS. 9A and 9B, the amount of magnetic field coupling with the NFC antenna coil 3 increases, thereby improving the performance characteristics of the NFC antenna coil 3.

Figure 10A:
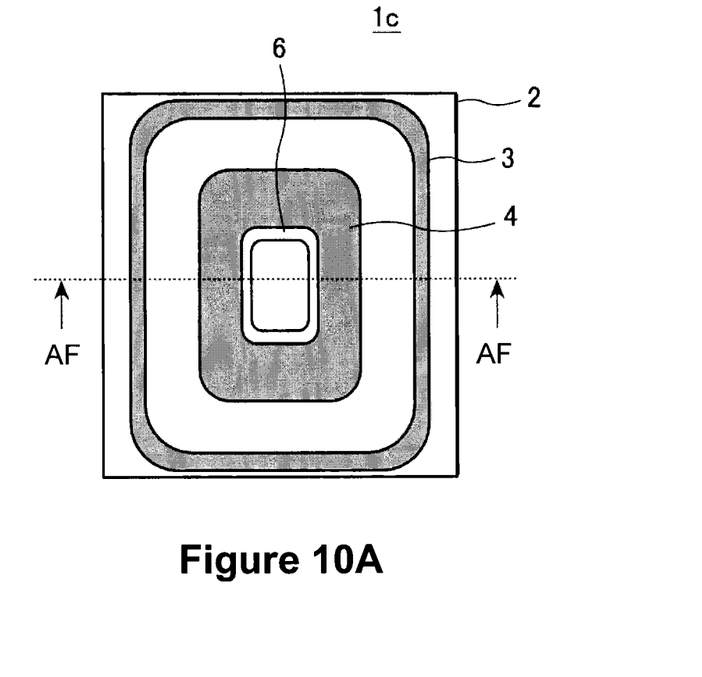
FIGS. 10A and 10B respectively illustrate a top view and cross-sectional view of an exemplary combo coil module that includes a resonance coil embedded in the combo coil module's magnetic sheet.
Figure 10B:
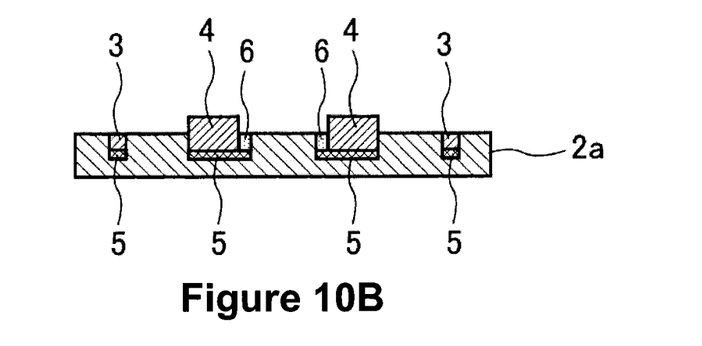

Next, in another aspect of the present disclosure, the exemplary arrangement of FIGS. 9A and 9B may be modified such that the resonance coil 6 is included within the embedded area of the magnetic sheet 2a. FIGS. 10A and 10B respectively illustrate a top view and cross-sectional view of an exemplary combo coil module 1c, which includes the resonance coil 6 embedded in the magnetic sheet 2a. Referring to FIG. 10B, which illustrates a cross-sectional view corresponding to line AF shown in FIG. 10A, the resonance coil 6 may be embedded within the magnetic sheet 2a at a position corresponding to an inner edge of the wireless power receiving coil 4. The resonance coil 6 may be embedded such that a top surface of the resonance coil 6 is substantially flush with the magnetic sheet 2a top surface. Alternatively, the resonance coil 6 may be embedded such that a portion of the resonance coil 6 side surfaces are exposed above the magnetic sheet 2a top surface.

Next, the foregoing examples discuss a case in which a combo coil module is used to mitigate the effects of external metal elements, such as a battery pack, in a mobile device. Accordingly, sizing characteristics of the exemplary combo coil module 1 discussed in the present disclosure were described as having a size corresponding to that of the battery pack in the mobile device. Sizing the combo coil module 1 based on the sizing of the battery pack provides the advantage of inhibiting magnetic influences from the battery pack without undue size increases of the mobile device.

As can easily be appreciated, battery sizing for mobile devices may vary substantially based on the type of device under consideration. For example, a tablet computer may have a battery pack having a much larger area than that of a mobile telephone. Further, other metallic elements aside from the battery may be of large sizes and these other elements may also negatively influence the combo coil module performance. Therefore, it may be desired to alter the sizing characteristics of the combo coil module 1 to accommodate for increased sizing of batteries and other mobile device elements.

Figure 11A:
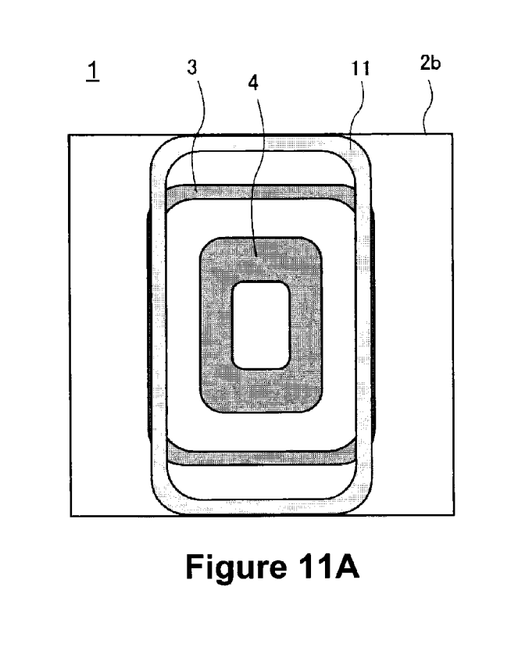
FIGS. 11A and 11B provide non-limiting examples of altering a size of a combo coil module based on a size of mobile device in which the combo coil mobile is used.
Figure 11B:
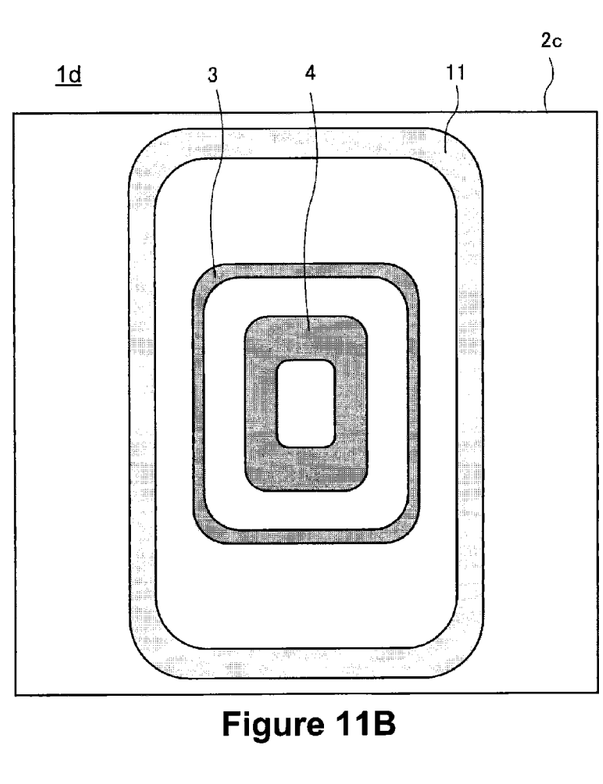

FIGS. 11A and 11B provide non-limiting examples of altering a size of a combo coil module based on features of the mobile device in which the combo coil mobile is used. Referring to the figures, in the case in which the combo coil module is mounted in a mobile device having a battery pack of large size, a magnetic sheet that is substantially square, such as magnetic sheets 2b and 2c shown in FIGS. 11A and 11B, may be formed to match a length of one side of the largest sized opposing antenna. For example, a side of the magnetic sheets 2b and/or 2c may correspond to the largest side of the opposing antenna 11 (i.e., RL-1). The reason for matching the length of one side of the magnetic sheet with the longest side of the opposing antenna is for acquiring a favorable magnetic coupling performance characteristic, regardless of the direction in which combo coil module 1d is held with respect to the opposing antenna. For example, regardless of the aspect in which the combo coil module 1d is held with respect to the opposing antenna 11 in FIG. 11B, magnetic coupling is favorable in all cases for 360 degrees of motion when a center of the opposing antenna 11 corresponds with a center of the combo coil module 1d. Similarly, the non-limiting example shown in FIG. 11A illustrates a case in which the size of one side of the square magnetic sheet 2b is matched with the longest side of the reference listener antenna RL-1 (i.e., 71.6 mm). Moreover, in the case in which the mobile device uses FeliCa, the size of one side of the magnetic sheet 2c may be matched with a long side of the opposing antenna of a reader/writer with the largest size (e.g., RC-S 462C having a longest side of 104 mm).

Figure 12A:
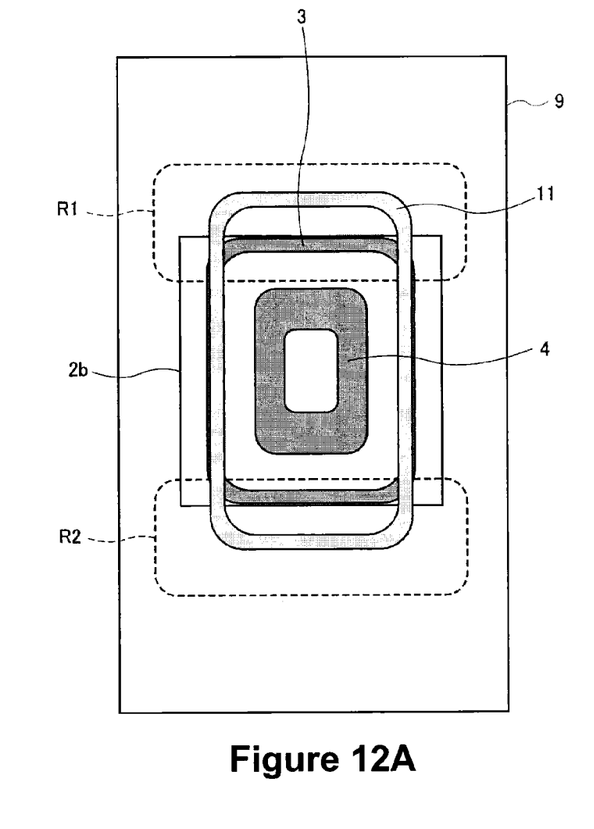
FIG. 12A provides a non-limiting example of a combo coil module that has not been resized to accommodate increases in size of a battery pack.
Figure 12B:
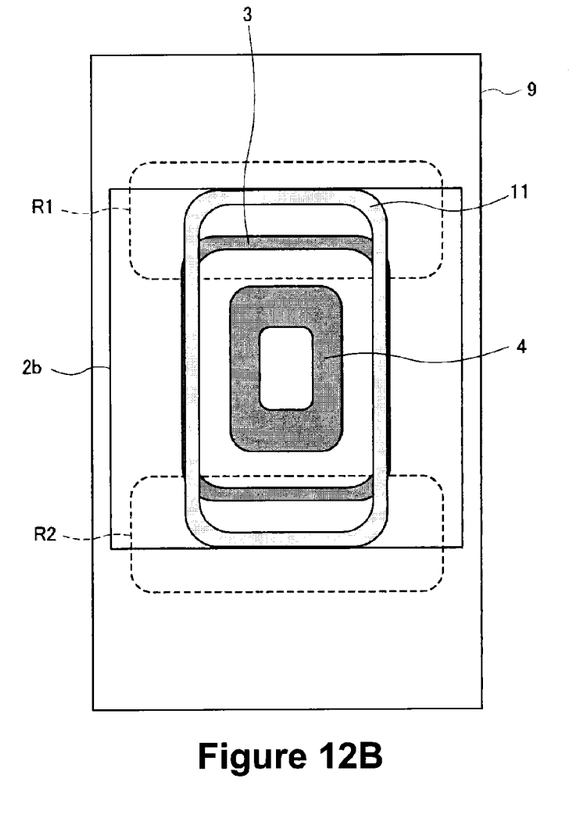
FIG. 12B illustrates a combo coil module that has been resized to accommodate a larger battery pack.

Next, FIG. 12A provides a non-limiting example of a combo coil module that has not been resized to accommodate increases in size of the battery pack 9, and FIG. 12B illustrates a combo coil module that has been resized to accommodate a larger battery pack 9.

Referring first to the case shown in FIG. 12A, when the battery pack 9 of an increased size exists behind the combo coil module, regions R1 and R2 at an upper and lower side of the opposing antenna 11 oppose the battery pack 9 directly rather than opposing the magnetic sheet 2b. That is, the magnetic sheet 2b is not interposed between the battery pack and the opposing antenna 11. Consequently, the performance characteristics of magnetic coupling of the opposing antenna 11 and the combo coil module 1 receive an influence from the battery pack 9, thereby decreasing performance characteristics.

Referring now to the exemplary case of FIG. 12B, the combo coil module is shown to have a magnetic sheet 2b of increased size to accommodate the larger size battery pack 9. As shown in the figure, when using the magnetic sheet 2b or magnetic sheet of larger size, the regions R1 and R2 do not mutually oppose the battery pack 9 directly, and instead the magnetic sheet 2b interposes the opposing antenna 11 and the battery pack 9. Consequently, the influence of the battery pack 9 with respect to the performance characteristics of magnetic coupling for the opposing antenna 11 and the combo coil module 1 is reduced.

Next, it may be desirable to enlarge the size of the combo coil module to accommodate a problem involving a position shift of the opposing antenna with respect to the combo coil module. That is, there may be a case in which an opposing antenna is held such that a center of the opposing antenna is offset from a center of the combo coil module. In this case, rather than altering the size of the coil elements of the combo coil module (i.e., the NFC antenna coil 3 and/or the wireless power receiving coil 4), one may simply adjust the size of the magnetic sheet included with the combo coil module to accommodate the problem of position shifts. For example, a side of a magnetic sheet on a combo coil module may be enlarged by a length of 5 mm to allow for a 5 mm position shift by the opposing antenna with respect to the combo coil module. It should be appreciated that since any increases in size of the magnetic sheet (or any other element of the combo coil module) will be accompanied by an increase in production and material costs of the combo coil module, an undue increase in the size of the combo coil module and its elements is undesirable. Therefore, design characteristics of the combo coil module elements should be carefully considered to optimize performance characteristics and magnetic interference mitigation.

Obviously, numerous modifications and variations of the present disclosure are possible in light of the above teachings. It is therefore to be understood that within the scope of the appended claims, the invention may be practiced otherwise than as specifically described herein. For example, advantageous results may be achieved if the steps of the disclosed techniques were performed in a different sequence, if components in the disclosed systems were combined in a different manner, or if the components were replaced or supplemented by other components. The functions, processes and algorithms described herein may be performed in hardware or software executed by hardware, including computer processors and/or programmable circuits configured to execute program code and/or computer instructions to execute the functions, processes and algorithms described herein. Additionally, some implementations may be performed on modules or hardware not identical to those described. Accordingly, other implementations are within the scope that may be claimed.

A skilled artisan will also appreciate that aspects of the present disclosure are applicable to wireless electric power charging systems of an electromagnetic induction type other than those explicitly described herein.

The functions and features described herein may also be executed by various distributed components of a system. For example, one or more processors may execute these system functions, wherein the processors are distributed across multiple components communicating in a network. The distributed components may include one or more client and/or server machines, in addition to various human interface and/or communication devices (e.g., display monitors, smart phones, tablets, personal digital assistants (PDAs)). The network may be a private network, such as a LAN or WAN, or may be a public network, such as the Internet. Input to the system may be received via direct user input and/or received remotely either in real-time or as a batch process.

It must be noted that, as used in the specification and the appended claims, the singular forms "a," "an," and "the" include plural referents unless the context clearly dictates otherwise.

The above disclosure also encompasses the embodiments noted below.

(1) An apparatus comprising: a near field communication (NFC) antenna coil; and a wireless power receiving coil, wherein the NFC antenna coil and the wireless power receiving coil are arranged on a magnetic sheet, the wireless power receiving coil is concentrically disposed on the magnetic sheet within an inner periphery of the NFC antenna coil, and an inner diameter of the wireless power receiving coil is greater than or equal to an inner diameter of reference listener antenna coil RL-6.

(2) The apparatus of (1), wherein an outer diameter of the wireless power receiving coil is less than an inner diameter of reference listener antenna coil RL-3.

(3) The apparatus of (1) or (2), wherein a diameter of the NFC antenna coil corresponds to a diameter of reference listener antenna coil RL-1.

(4) The apparatus of any one of (1) to (3), wherein an outer diameter of the NFC antenna coil corresponds to an outer diameter of the reference listener antenna RL-1.

(5) The apparatus of any one of (1) to (4), further comprising a resonance coil arranged on the magnetic sheet within an inner periphery of the wireless power receiving coil.

(6) The apparatus of any one of (1) to (5), wherein at least one of the NFC antenna coil and the wireless power receiving coil are embedded in the magnetic sheet.

(7) The apparatus of any one of (1) to (6), wherein the at least one of the NFC antenna coil and the wireless power receiving coil are embedded in the magnetic sheet at a depth corresponding to a thickness of the NFC antenna coil.

(8) The apparatus of any one of (1) to (7), further comprising: a resonance coil arranged on the magnetic sheet within an inner periphery of the wireless power receiving coil.

(9) The apparatus of any one of (1) to (8), wherein the resonance coil is embedded in the magnetic sheet.

(10) The apparatus of any one of (1) to (9), wherein a thickness of the NFC antenna coil module is less than a thickness of the wireless power receiving coil.

(11) The apparatus of any one of (1) to (10), wherein the magnetic sheet has a substantially square shape.

(12) The apparatus of any one of (1) to (11), wherein a length of a side of the magnetic sheet corresponds to a length of a side of reference listener antenna coil RL-1.

(13) The apparatus of any one of (1) to (12), wherein: the apparatus is configured to be installed in a mobile device, the mobile device including circuitry configured to provide an electric current to power the mobile device, and dimensions of the magnetic sheet correspond to dimensions of the circuitry.

(14) The apparatus of any one of (1) to (13), wherein the magnetic sheet has dimensions greater than dimensions of reference listener antenna coil RL-1.

(15) The apparatus of any one of (1) to (14), wherein the magnetic sheet is mounted on a battery.

(16) A mobile device comprising: circuitry configured to provide an electric current to power the mobile device; a near field communication (NFC) antenna coil; and a wireless power receiving coil, wherein the NFC antenna coil and the wireless power receiving coil are arranged on a magnetic sheet, the wireless power receiving coil is concentrically disposed on the magnetic sheet within an inner periphery of the NFC antenna coil, an inner diameter of the wireless power receiving coil is greater than or equal to an inner diameter of reference listener antenna coil RL-6, and the magnetic sheet is interposed in the mobile device between the circuitry and each of the NFC antenna coil and the wireless power receiving coil.

(17) The mobile device of (16), wherein an outer diameter of the wireless power receiving coil is less than an inner diameter of reference listener antenna coil RL-3.

(18) The mobile device of (16) or (17), wherein a diameter of the NFC antenna coil corresponds to a diameter of reference listener antenna coil RL-1.

(19) The mobile device of any one of (16) to (18), wherein dimensions of the magnetic sheet correspond to dimensions of the circuitry.

(20) A method of simultaneously providing a near field communication (NFC) function and a wireless power charging function for a mobile device, the method comprising: arranging an NFC antenna coil and a wireless power receiving coil on a magnetic sheet, wherein the wireless power receiving coil is concentrically disposed on the magnetic sheet within an inner periphery of the NFC antenna coil, an inner diameter of the wireless power receiving coil is greater than or equal to an inner diameter of reference listener antenna coil RL-6, the mobile device includes circuitry configured to provide an electric current for powering the mobile device, and the magnetic sheet is interposed in the mobile device between the circuitry and each of the NFC antenna coil and the wireless power receiving coil.

The invention claimed is:

1. An apparatus comprising:
a near field communication (NFC) antenna coil;
a wireless power charge (WPC) receiving coil, wherein the NFC antenna coil and the WPC receiving coil are arranged on a magnetic sheet; and
a resonance coil arranged on the magnetic sheet within an inner periphery of the WPC receiving coil, wherein
the WPC receiving coil is concentrically disposed on the magnetic sheet within an inner periphery of the NFC antenna coil, and
an inner diameter of the WPC receiving coil is greater than or equal to an inner diameter of reference listener antenna coil 6 (RL-6).

2. The apparatus of claim 1, wherein
an outer diameter of the WPC receiving coil is less than an inner diameter of reference listener antenna coil 3 (RL-3).

3. The apparatus of claim 1, wherein
a diameter of the NFC antenna coil corresponds to a diameter of reference listener antenna coil 1 (RL-1).

4. The apparatus of claim 3, wherein
an outer diameter of the NFC antenna coil corresponds to an outer diameter of the reference listener antenna 1 (RL-1).

5. The apparatus of claim 1, wherein
at least one of the NFC antenna coil and the WPC receiving coil are embedded in the magnetic sheet.

6. The apparatus of claim 5, wherein
the at least one of the NFC antenna coil and the WPC receiving coil are embedded in the magnetic sheet at a depth corresponding to a thickness of the NFC antenna coil.

7. The apparatus of claim 5, further comprising:
a resonance coil arranged on the magnetic sheet within an inner periphery of the WPC receiving coil.

8. The apparatus of claim 7, wherein
the resonance coil is embedded in the magnetic sheet.

9. The apparatus of claim 1, wherein
a thickness of the NEC antenna coil is less than a thickness of the WPC receiving coil.

10. The apparatus of claim 1, wherein
the magnetic sheet has a substantially square shape.

11. The apparatus of claim 10, wherein
a length of a side of the magnetic sheet is substantially the same as a length of a side of reference listener antenna coil 1 (RL-1).

12. The apparatus of claim 1, wherein:
the apparatus is configured to be installed in a mobile device, the mobile device including circuitry configured to provide an electric current to power the mobile device, and
dimensions of the magnetic sheet correspond to dimensions of the circuitry.

13. The apparatus of claim 1, wherein
The magnetic sheet has dimensions greater than dimensions of reference listener antenna coil 1 (RL-1).

14. The apparatus of claim 1, wherein
the magnetic sheet is mounted on a battery.

15. A mobile device comprising:
circuitry configured to provide an electric current to power the mobile device;
a near field communication (NFC) antenna coil; and
a wireless power charge (WPC) receiving coil, wherein the NFC antenna coil and the WPC receiving coil are arranged on a magnetic sheet; and
a resonance coil arranged on the magnetic sheet within an inner periphery of the WPC receiving coil, wherein
the WPC receiving coil is concentrically disposed on the magnetic sheet within an inner periphery of the NFC antenna coil,
an inner diameter of the WPC receiving coil is greater than or equal to an inner diameter of reference listener antenna coil 6 (RL-6), and
the magnetic sheet is interposed in the mobile device between the circuitry and each of the NFC antenna coil and the WPC receiving coil.

16. The mobile device of claim 15, wherein an outer diameter of the WPC receiving coil is less than an inner diameter of reference listener antenna coil 3 (RL-3).

17. The mobile device of claim 15, wherein a diameter of the NFC antenna coil corresponds to a diameter of reference listener antenna coil 1 (RL-1).

18. The mobile device of claim 15, wherein dimensions of the magnetic sheet correspond to dimensions of the circuitry.

19. An apparatus comprising:
a near field communication (NFC) antenna coil arranged on a magnetic sheet;
a wireless power charge (WPC) receiving coil arranged on the magnetic sheet; and
a resonance coil arranged on the magnetic sheet within an inner periphery of the WPC receiving coil, wherein
the WPC receiving coil is concentrically disposed on the magnetic sheet within an inner periphery of the NFC antenna coil.

\* \* \* \* \*